United States Patent [19]

Schneider et al.

[11] Patent Number: 4,865,161
[45] Date of Patent: Sep. 12, 1989

[54] SLIDING SADDLE DISC BRAKE

[75] Inventors: Wilhelm Schneider, Mannheim; Paul Antony, Worms; Bernd Rupprecht, Edingen-Neckarjausen, all of Fed. Rep. of Germany

[73] Assignee: Deutsche Perrot-Bremse GmbH, Mannheim, Fed. Rep. of Germany

[21] Appl. No.: 317,122

[22] Filed: Mar. 1, 1989

Related U.S. Application Data

[63] Continuation of Ser. No. 60,986, Jun. 10, 1987, abandoned, which is a continuation of Ser. No. 815,503, Jan. 2, 1986, abandoned.

[51] Int. Cl.⁴ ............................................. F16D 65/52
[52] U.S. Cl. ................................ 188/71.8; 188/73.45; 188/196 P
[58] Field of Search ................ 188/71.8, 73.44, 73.45, 188/196 P; 192/111 A

[56] References Cited

U.S. PATENT DOCUMENTS

| Re. 30,255 | 4/1980 | Rath et al. | 188/73.45 |
|---|---|---|---|
| 2,531,341 | 11/1950 | Meador, Jr. | 188/71.8 |
| 2,866,526 | 12/1958 | Wiseman, Jr. | 188/71.8 |
| 3,072,221 | 1/1963 | Peras | 188/196 P |
| 3,095,064 | 6/1963 | Tankersley et al. | 188/71.8 |
| 3,122,222 | 2/1964 | Burnett et al. | 188/196 P |
| 3,338,353 | 8/1967 | Lucien | 188/71.8 X |
| 3,339,683 | 9/1967 | Burnett | 188/71.8 X |
| 3,580,366 | 5/1971 | Plaat et al. | 188/71.8 X |
| 3,618,714 | 11/1971 | Croswell | 188/71.8 |
| 4,436,186 | 3/1984 | Ritsema et al. | 188/71.8 |
| 4,537,288 | 8/1985 | Stoka . | |

FOREIGN PATENT DOCUMENTS 2510036 9/1975 Fed. Rep. of Germany ... 188/73.45
2918502 11/1979 Fed. Rep. of Germany .

Primary Examiner—George E. A. Halvosa
Attorney, Agent, or Firm—Collard, Roe & Galgano

[57] ABSTRACT

A brake having a brake carrier and saddle is disclosed in which a sliding bolt fastened to the saddle is received in a bore in the carrier. After actuation by the brake by hydraulic piston, the saddle is returned to its rest position by a compression spring. A friction element is provided between the sliding bolt in the bore for limiting the travel of the saddle in response to the bias of the spring. The friction element exerts a force greater than the bias of the spring but less than that exerted by the brake actuator, such that the brake is self-adjusting for lining wear. The brake is disclosed in plural embodiments.

1 Claim, 3 Drawing Sheets 4,865,161

SLIDING SADDLE DISC BRAKE

This application is a continuation of Ser. No. 060,986, filed June 10, 1987, which in turn is a continuation of Ser. No. 815,503, filed Jan. 2, 1986, both now abandoned.

BACKGROUND OF THE INVENTION

1. Field of the Invention

This invention relates to a sliding saddle disc brake comprising a brake carrier and a brake saddle guided in an axially displaceable manner on the brake carrier. The brake saddle straddles the brake disc and carries a brake hydraulic activation mechanism on one side of the brake disc. The brake activation mechanism includes two sliding bolts fastened to the brake saddle which slide in bores on the brake carrier.

2. Related Art

A sliding saddle disc brake of this general type is described in German Offenlegungsschrift No. 29 18 502. After hydraulic actuation, return of the brake piston to its initial position is achieved by the resilience of an elastically deformable sealing ring mounted in the brake cylinder. This arrangement has the deficiency that the brake lining on the side of the disc opposite the hydraulic brake activation mechanism is not lifted off the brake disc. Accordingly, any vibration of the brake saddle, for example, due to jolts caused by uneven road surfaces and the like, results in the generation of noise and wear.

While adjustment mechanisms for hydraulic brakes have been suggested to achieve clearance between the pads on the side of the disc away from the cylinder and the disc, none of those known to the present inventors solve the problem of actual displacement resulting from vibration.

OBJECT OF THE INVENTION

It is therefore an object of the invention to provide a sliding saddle disc brake which prevents lateral vibration of the brake saddle and provides automatic adjustment of the brake saddle relative to the brake carrier as required due to wear of the brake lining.

SUMMARY OF THE INVENTION

According to the present invention, a sliding saddle disc brake is provided comprising a brake carrier and a brake saddle. The brake saddle is axially displaceable with respect to the brake carrier and straddles the brake disc. A hydraulic brake actuator is disposed on the brake saddle on one side of the brake disc. Two sliding bolts are fastened to the brake saddle and slide in corresponding bores of the brake carrier. A compression spring is interposed between the brake carrier and at least one of the sliding bolts, such that the spring is compressed upon actuation of the brake. The axial displacement of the sliding bolts in their bores is limited by a pair of cooperating abutments on the brake carrier and on the sliding bolt, respectively.

In a preferred embodiment, two of the sliding bolts are provided, and each has its own cooperating compression spring.

After cessation of the hydraulic force at the end of a braking operation, the brake saddle is urged axially with respect to the brake carrier by the helical compression springs on the guiding bolts, so that the brake lining on both sides is lifted off the brake disc by a predetermined clearance. This prevents the brake lining from coming into contact with the disc when the brake is not actuated. The clearance is defined by cooperating abutments in the sliding bolt/bore assembly. When lining wear exceeds the predetermined clearance, subsequent axial displacement of the brake saddle upon actuation results in one of the cooperating abutments, which is only frictionally keyed to its portion of the brake assembly, being axially displaced. In this way the preset clearance is maintained independently of the degree of wear of the brake linings.

In one particularly advantageous embodiment of the invention, the sliding bolt has an axial bore. An abutment bolt fastened to the brake carrier extends into the axial bore coaxial with the helical compression spring.

In the first embodiment of the invention one of the two abutments is adjusted relative to the sliding bolt. The axial bore of the sliding bolt has an adjustment sleeve frictionally keyed into it whose inner end is at a distance from the abutment formed on the abutment bolt corresponding to the preset lining clearance. On the outer end of the adjustment sleeve there is a ledge which confines the helical compression spring. A frictionally keyed connecting tolerance ring is interposed between the sliding bolt and the adjustment sleeve.

In a second embodiment of the invention, adjustment of the two abutments relative to the brake carrier is provided. In this case one or more gripping rings are mounted on the abutment bolt and are frictionally secured thereto. A sleeve is screwed into the axial bore of the sliding bolt, the inner end of which is at a distance from the gripping ring corresponding to the lining clearance. The outer end of the sleeve supports the compression spring.

BRIEF DESCRIPTION OF THE DRAWINGS

The invention will be better understood if reference is made to the accompanying drawings, in which.

DESCRIPTION OF THE PREFERRED EMBODIMENTS

Figure 1:
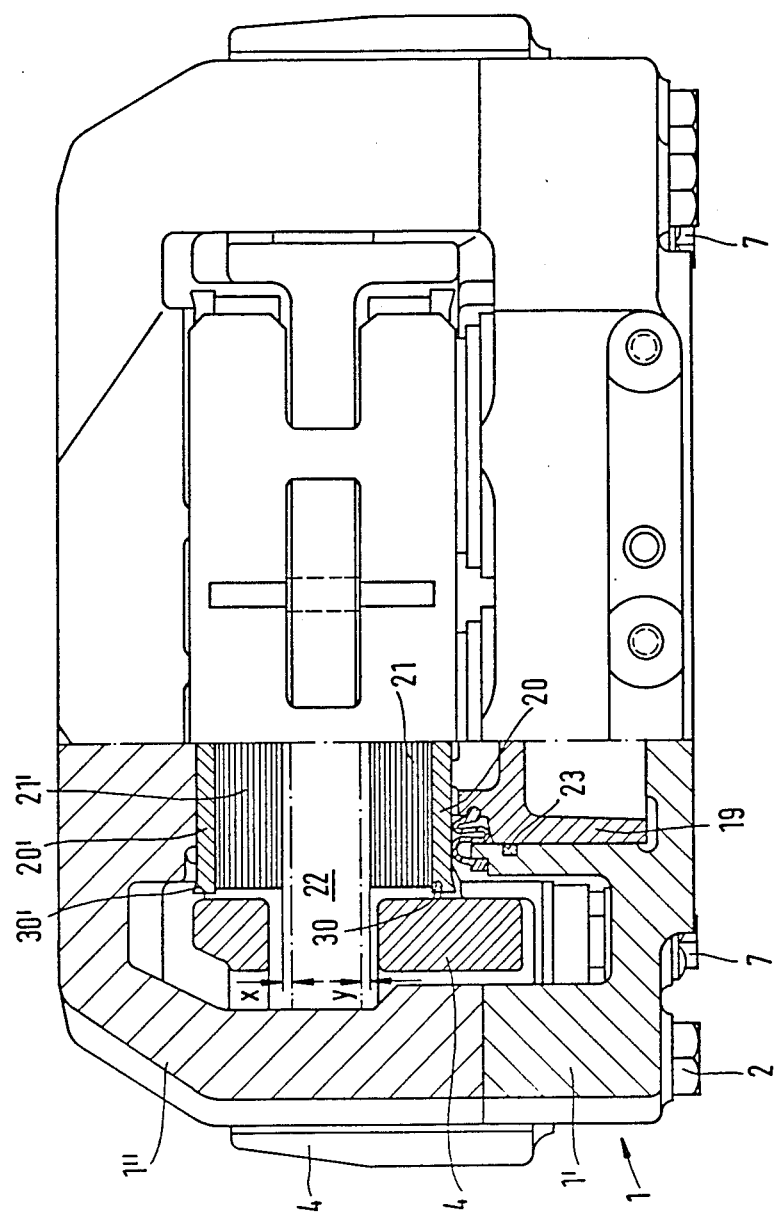
FIG. 1 is a partly sectional view of the sliding saddle disc brake of the invention.
Figure 2:
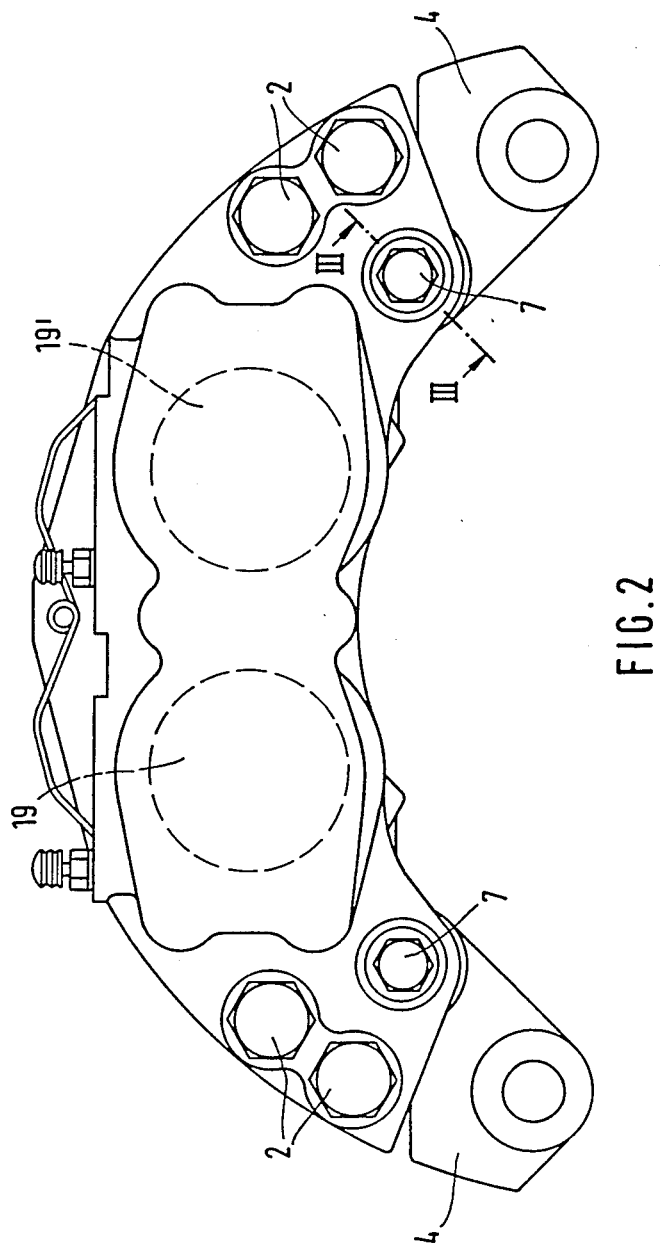
FIG. 2 is a side view of the sliding saddle disc brake of the invention.

As can be observed from FIGS. 1 and 2, the sliding saddle disc brake of the invention comprises two parts 1' and 1" fastened together by screws 2 to form a unitary saddle member 1. In part 1' of brake saddle 1, there are arranged two brake pistons 19 and 19' of a conventional hydraulic brake actuator mechanism. Brake saddle 1 is slidingly mounted to brake carrier 4 by two sliding bolts 3 (see FIGS. 3 and 4). Sliding bolts 3 are provided with a hexagonal head portion 5 and an internal thread 6. A screw 7 is screwed via a bore 8 in brake saddle part 1' into internal thread 6 of sliding bolt 3. The sliding bolt 3 is thus fixed to the brake saddle part 1'.

Sliding bolt 3 fits within sleeve 9 which is pressed into a bore 10 of brake carrier 4. The sliding mounting thereby provided is protected against dirt by a boot 11 fitting tightly on sliding bolt 3 and brake carrier 4. An abutment bolt 12 is screwed into a bore 10 of brake carrier 4, and has a sealing washer 13 interposed therebetween. An adjustment sleeve 14 fits over bolt 12. A nut 16 is screwed onto the free end of abutment bolt 12, which nut 16 is at a distance L from the inner end of adjustment sleeve 14. A helical compression spring 15 is supported on nut 16 and a ledge surface 28 formed on the internal bore of the adjustment sleeve 14. Spring 15 thus urges adjustment sleeve 14 into abutment with floor 17 of bore 10. Sliding bolt 3 is provided with an axial bore 24 which receives the adjustment sleeve 14. Adjustment sleeve 14 is closely fit into the bore 24 by a tolerance ring 18.

Upon operation of the disc brake, the brake pistons 19, 19' are hydraulically actuated, whereupon the corresponding brake lining carrier 20 is brought into contact with brake lining 21 on brake disc 22. Due to the force exerted on the brake disc by pistons 19, 19', brake saddle 1 is moved axially, that is, away from brake disc 22, whereby the sliding bolts 3 are displaced in the axial bores 10 of the brake carrier 4, until the clearance L is exceeded and the brake lining 21' of the opposite brake lining carrier 20' is then brought into contact with the opposite side of the brake disc 22. Upon this displacement, sliding bolts 3 and axial bore 10 of brake carrier 4, and adjustment sleeve 14 (which is frictionally keyed to sliding bolt 3) are also displaced against the spring bias of compression spring 15. Therefore, upon completion of the braking operation, adjustment sleeve 14 and sliding bolt 3 frictionally keyed thereto are urged by spring 15 to return to their original position. This causes sliding bolt 3 to return brake saddle 1 to its neutral position and restores the clearance L, providing air gap X (see FIG. 1). The required air gap Y also reappears between the brake disc 22 and the brake lining 21 on the piston side, as the elastically deformed square sealing ring 23 urges the pistons 19, 19' towards their original position in a manner known in the art.

Tolerance ring 18 provides frictional engagement between sliding bolt 3 and adjustment sleeve 14, which friction is sufficient to define the axial displacement of brake saddle 1 with respect to brake carrier 4, providing the clearance amount L. As the brake linings wear, greater displacement of the brake saddle 1 will become necessary. Upon movement of the brake saddle greater than the distance L, the frictional adhesion of tolerance ring 18 to the sliding bolt 3 in adjustment sleeve 14 will be overcome, and sliding bolt 3 will move with respect to adjustment sleeve 14 as required by the wearing of the brake linings.

Figure 3:
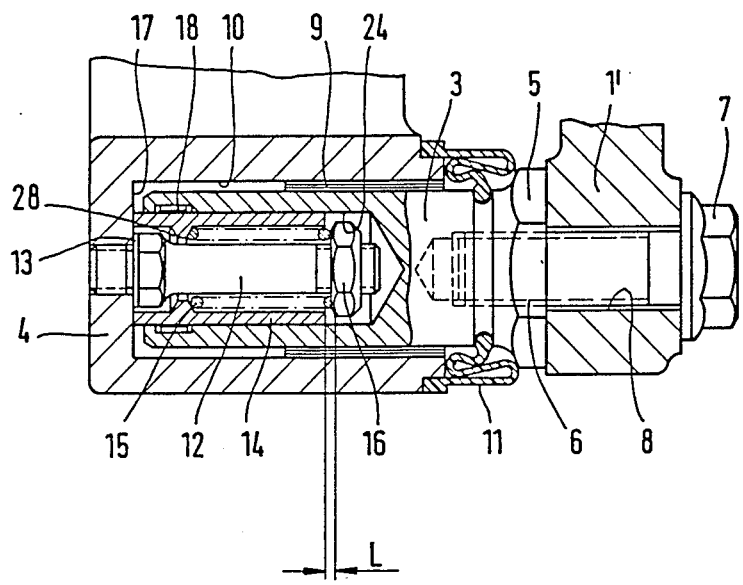
FIG. 3 is a cross section taken on line 3—3 of FIG. 2.
Figure 4:
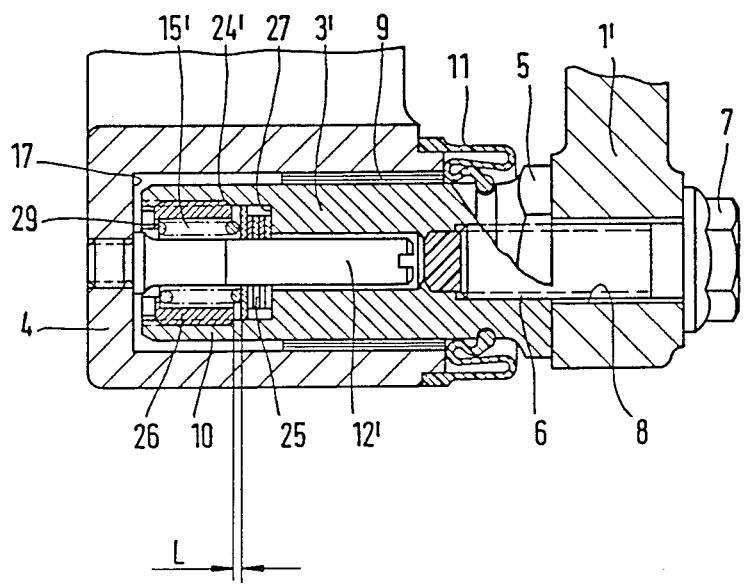
FIG. 4 is a section similar to that of FIG. 3 taken with respect to a second embodiment of the invention.

A second embodiment of the sliding saddle disc brake of the invention is shown in FIG. 4, in which case gripping rings 25 perform the function performed by tolerance ring 18 in the embodiment of FIG. 3. Sliding bolt 3' is fastened to brake saddle part 1' by means of screw 7, as shown in connection with FIG. 3. An abutment bolt 12' is threaded into bore 10 of brake carrier 4 and is fixed thereto by hardening sealant. Sliding bolt 3' is formed with a threaded bore 24', into which is screwed a threaded sleeve 26, again assembled with a hardening sealant. Gripping rings 25 are keyed frictionally onto abutment bolt 12'. In their rest position gripping rings 25 abut floor 27 of axial bore 24' of sliding bolt 3'. A helical compression spring 15 is coaxial with abutment bolt 12' and is confined between gripping rings 25 and by a circular ledge 29 formed on the interior bore of threaded sleeve 26.

Upon operation of the brake, brake saddle 1' together with sliding bolt 3' are axially displaced relative to the brake carrier 4 and abutment bolts 12', compressing the helical compression spring 15'. At the end of the braking operation the bias of compression spring 15 urges sliding bolt 3' and sliding saddle 1' back to their original position. Should wear of the brake linings cause the motion of the brake saddle part 1' to exceed the clearance L, threaded sleeve 26 which abuts gripping rings 25 urges them rightwardly relative to the abutment bolt 12'. When the helical compression spring is relaxed after the braking operation, sliding bolt 3' therefore takes up a new position with respect to abutment bolts 12'.

As in the embodiment of FIG. 3, any axial displacement of the brake saddle resulting from lateral vibrations due to play in the axle bearings or unevenness in the road surface are effectively suppressed by the compression of the compression spring in both embodiments of the invention, because the spring prevents axial displacement and keeps the air gaps X and Y constant.

A further advantage in the construction of the brake of the invention involves the guidance of the brake saddle 1 upon the two sliding bolts 3. As can be seen from FIG. 1, the brake lining carriers abut support surfaces 30, 30' formed on the brake carrier 4. Sliding bolts 3 therefore only have to resist the torque exerted by the brake pads prior to the linings contacting abutting the surfaces 30, 30'. Accordingly the sliding bolts can be made smaller, economizing in cost, weight and size of the brake assembly.

It will be appreciated by those skilled in the art that while a preferred embodiment of the invention has been described, a large number of modifications and improvements can be made thereto without departure from the essential spirit and scope of the invention. Specifically, while the embodiments describe each include at least two sliding bolts 3, provision of a single bolt for this purpose is within the scope of the invention, possibly together with other means for supporting the brake saddle for axial movement with respect to the brake carrier. It would also be within the scope of the invention for the brake saddle to be formed with axial bores for receiving bolts fastened to the brake carrier, that is, in the inverse arrangement from that shown in the drawings hereof. Therefore, while two preferred embodiments of the invention have been described, they should not be taken as a limitation on the scope of the invention, which is only to be measured by the following claims.

We claim:

1. A sliding saddle disc brake comprising a brake carrier and a brake saddle movable with respect to said carrier, said saddle straddling a brake disc and carrying a hydraulic brake activation mechanism on one side of the brake disc, wherein at least one bolt is fastened to said brake saddle, said bolt having a stepped axial bore, said bolt being slidable within a corresponding axial bore formed in said brake carrier, a helical compression spring confined within the stepped bore formed in said sliding bolt, said spring being compressed upon axial displacement of the brake saddle caused by actuation of the hydraulic brake activation mechanism, an abutment bolt connected to said brake carrier and extending into a first step portion of said stepped bore in said sliding bolt, a plurality of gripping rings of predetermined combined thickness mounted in a second stepped portion of said bore in said sliding bolt and frictionally keyed to said abutment bolt, said gripping rings contacting a step formed between said first and second stepped portions, said gripping rings confining a first end of said spring and a sleeve for adjusting clearance in the brake threaded into a threaded portion of the second stepped portion of the axial bore of said sliding bolt, said sleeve and said helical compression spring located at an end of said sliding bolt adjacent the connection of said abutment bolt to said brake carrier, the inner end of said sleeve being spaced a predetermined distance form said step corresponding to a preset clearance, a minimum clearance position of said adjustable sleeve being defined by the difference between said predetermined distance and said predetermined combined thickness of said gripping rings, and said sleeve comprising a circular retainer for confining the other end of the helical compression spring.

* * * * *